US 8,867,372 B2

(12) United States Patent
Olgaard et al.

(10) Patent No.: US 8,867,372 B2
(45) Date of Patent: Oct. 21, 2014

(54) METHOD FOR EFFICIENT PARALLEL TESTING OF TIME DIVISION DUPLEX (TDD) COMMUNICATIONS SYSTEMS

(75) Inventors: Christian Volf Olgaard, Saratoga, CA (US); Ruizu Wang, San Ramon, CA (US); Erdem Serkan Erdogan, Sunnyvale, CA (US); Mathew Philip, Palo Alto, CA (US)

(73) Assignee: Litepoint Corporation, Sunnyvale, CA (US)

( * ) Notice: Subject to any disclaimer, the term of this patent is extended or adjusted under 35 U.S.C. 154(b) by 128 days.

(21) Appl. No.: 13/462,255

(22) Filed: May 2, 2012

(65) Prior Publication Data

US 2013/0294255 A1    Nov. 7, 2013

(51) Int. Cl.
H04L 12/26    (2006.01)
(52) U.S. Cl.
CPC ..................................... *H04L 12/26* (2013.01)
USPC ........................................................... 370/242
(58) Field of Classification Search
USPC .................. 370/241, 242–250; 375/213, 224; 714/715, 718, 724, 744
See application file for complete search history.

(56) References Cited

U.S. PATENT DOCUMENTS

| 7,564,893 | B2 * | 7/2009 | O'Neill .......................... 375/219 |
| 7,962,823 | B2 * | 6/2011 | Olgaard ......................... 714/742 |
| 2005/0240852 | A1 * | 10/2005 | Inaba et al. .................... 714/740 |
| 2006/0195747 | A1 | 8/2006 | Pramanick et al. |
| 2010/0008237 | A1 | 1/2010 | Olgaard |
| 2011/0069624 | A1 | 3/2011 | Olgaard |
| 2012/0051224 | A1 | 3/2012 | Olgaard |

FOREIGN PATENT DOCUMENTS

WO    2011-127973 A1    10/2011

OTHER PUBLICATIONS

International Search Report and Written Opinion Dated Aug. 23, 2013, for PCT Application No. PCT/US2013/037941.

* cited by examiner

*Primary Examiner* — Frank Duong
(74) *Attorney, Agent, or Firm* — Vedder Price, P.C.

(57) ABSTRACT

The invention described herein utilizes devices under test (DUTs) outfitted with stored, predefined test sequences, testers equipped with vector-signal generation (VSG) and vector-signal analysis (VSA) functionality, and novel methods for combining loopback and single-ended test functions in order to obtain higher testing efficiency for DUTs using Bluetooth or other time-division duplex (TDD) based communications.

22 Claims, 11 Drawing Sheets

METHOD FOR EFFICIENT PARALLEL TESTING OF TIME DIVISION DUPLEX (TDD) COMMUNICATIONS SYSTEMS

TECHNICAL FIELD

The present invention relates generally to systems and methods for testing electronic equipment. More particularly, it relates to improvements in systems and methods for testing wireless devices using test platforms consisting of hardware, firmware, and/or software components requiring minimal feedback from the devices.

BACKGROUND

Many of today's handheld devices make use of wireless "connections" for telephony, digital data transfer, geographical positioning, and the like. Despite differences in frequency spectra, modulation methods, and spectral power densities, the wireless connectivity standards use synchronized data packets to transmit and receive data.

In general, all of these wireless-connectivity capabilities (e.g., WiFi, WiMAX, Bluetooth, etc.) are defined by industry-approved standards (e.g., IEEE 802.11 and IEEE 802.16) which specify the parameters and limits to which devices having those connectivity capabilities must adhere.

At any point along the device-development continuum, it may be necessary to test and verify that a device is operating within its standards' specifications. Most such devices are transceivers, that is, they transmit and receive wireless RF signals. Specialized systems designed for testing such devices typically contain subsystems designed to receive and analyze device-transmitted signals, and to send signals that subscribe to industry-approved standards so as to determine whether a device is receiving and processing the wireless signals in accordance with its standard.

Increasingly, wireless devices are using embedded control subsystems to control the operations of a variety of wireless capabilities, such as 3G cellular, IEEE 802.11x, Bluetooth, and the like. Such designs may limit the test-control interface options and force control to be accomplished through an embedded controller rather than directly with a specific subsystem. In addition, there is continuous pressure to reduce both the cost of manufacturing such devices, and for testing their operation during manufacturing. Any innovation that can reduce the time required for testing such devices, without compromising the integrity of the testing, will result in lower test costs.

Figure 1:
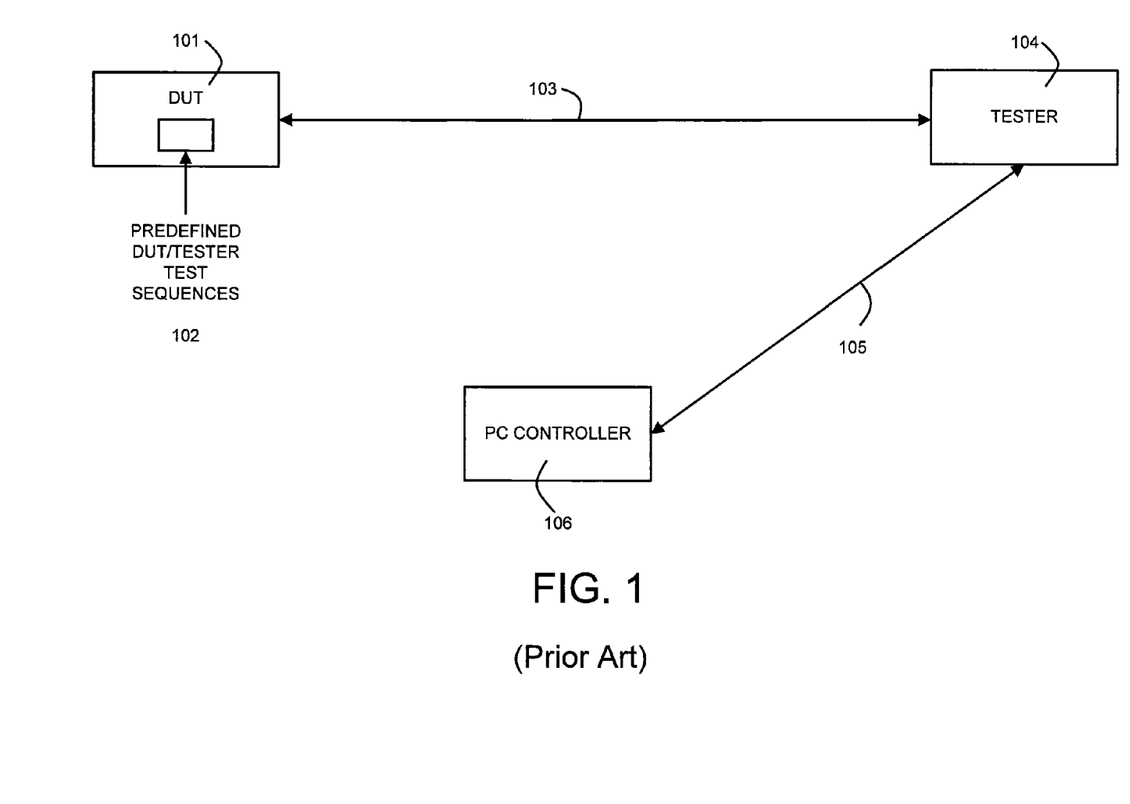
FIG. 1 depicts a conventional wireless test system.

FIG. 1 depicts a prior testing setup 100 which may generally comprise a tester 104 with vector-signal analysis (VSA) and vector-signal generation (VSG) functionality, a device under test (DUT) 101 with stored predefined test sequences 102, and a PC controller 106 for controlling the tester. A bidirectional communications interface 103 supports communications between the DUT 101 and tester 104. Likewise, a bidirectional communications interface 105 supports communications between the PC controller 106 and tester 104. The bidirectional communications interfaces 103, 105 may be conductive or wireless (e.g., RF, IR, etc.) interfaces. The DUT 101, as shown, is capable of storing a predefined test sequence 102 of which both the DUT 101 and tester 104 are "aware." By this configuration, one can reduce the number of non-test-related communications interactions between the DUT and tester.

Figure 2:
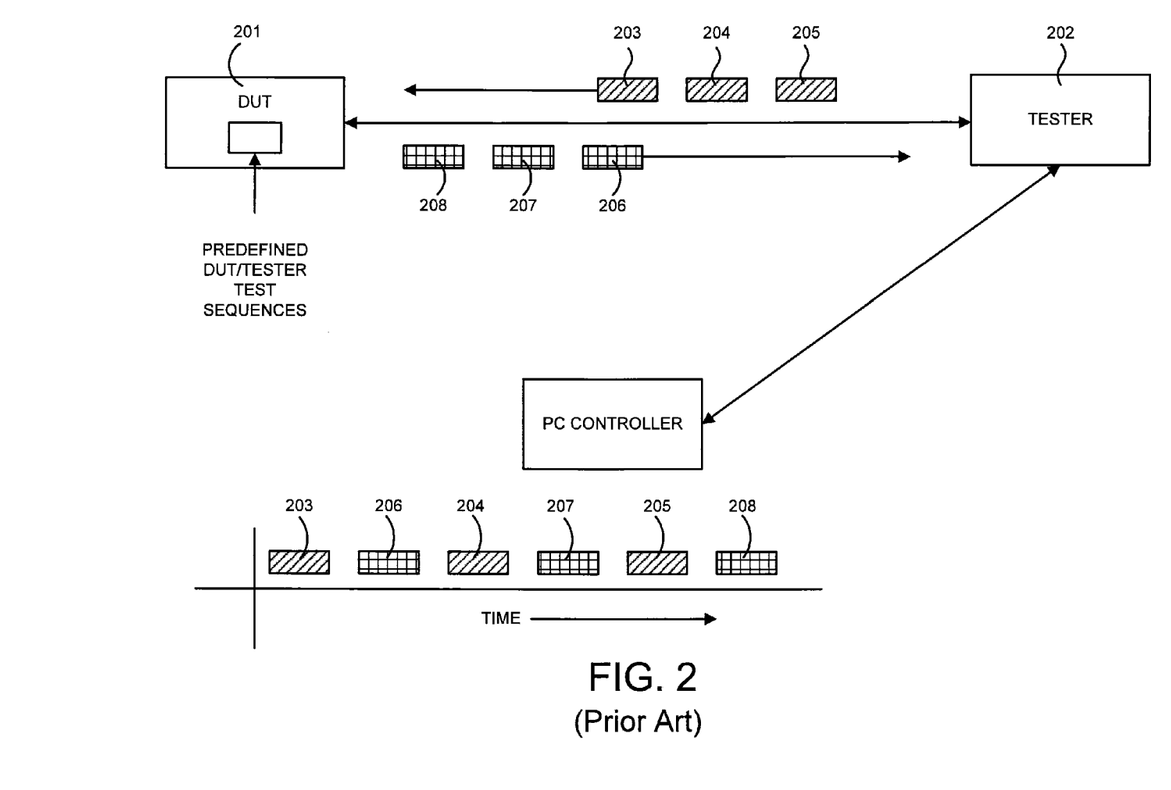
FIG. 2 illustrates a loopback-type test according to a prior test method.

Referring to FIG. 2, the test system of FIG. 1 can be used to implement a loop-back test whereby packets 203, 204, 205 sent by the tester 202 are received by the DUT 201. In turn, the DUT 201 will send the packet payloads received embedded as new packets 206, 207, 208, respectively, back to tester 202. Thus, if tester 202 sends three packets using three time slots, the DUT 201 will loop back three packets using three time slots. The total time, in this case, would be six time slots. While proven useful, additional time slots would be required for extensive testing sequences and for multiple devices.

Figure 3:
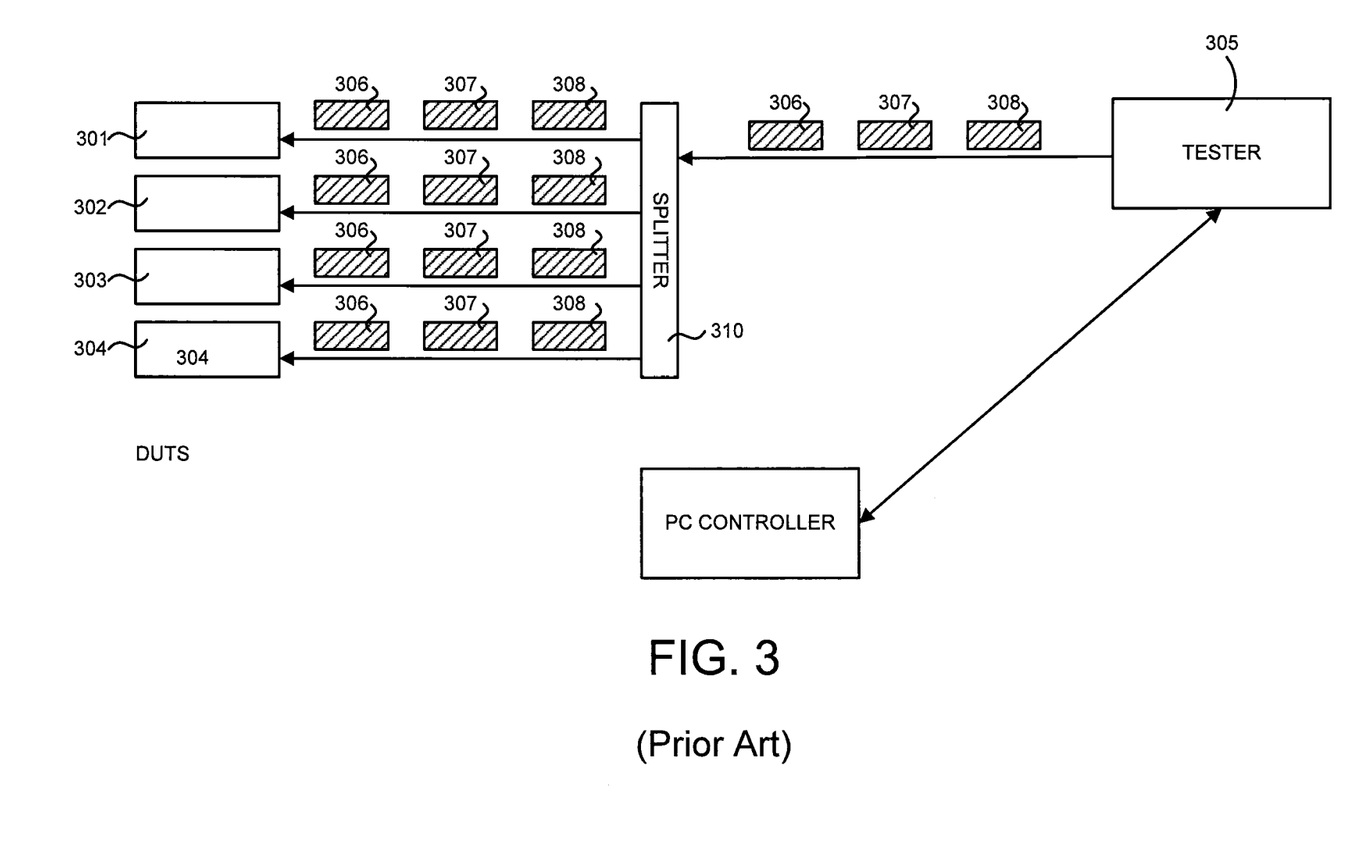
FIG. 3 illustrates a wireless test system including a multiport interface whereby a sequence of packets is replicated in parallel according to a prior design.

Other systems and methods have been employed in an attempt to test disclosed systems in an efficient manner. Referring to FIG. 3, the same apparatus of FIG. 2 is now used with the addition of a multiport interface 310 between the tester 305 and multiple DUTs 301-304 under test. The multiport interface or splitter interface 310 is employed whereby a sequence of packets 306, 307, 308 may be replicated in parallel. In this exemplary setup, the multiport interface 310 is a four-port splitter (one in/four out) configured for four DUTs to be simultaneously tested. The tester 305, using a single VSG, sends a sequence of packets 306, 307, 308, which are replicated using the circuitry of the splitter 310 as is well known in the art. The multiport interface 310 can be part of (e.g., internal to) and controlled by the host controller of tester 305, or can be separate from (e.g., external to) tester 305 and controlled by the host controller of tester 305 via a control interface (not shown). Each packet sent by the VSG results in four copies of the data packets 306, 307, 308 sent to each of the DUTs 301, 302, 303, 304, as shown. As a result, the three time slots used for sending the three VSG packets results in three sets of four copies of the packets being received by the four DUTs 301, 302, 303, 304. Consequently, the per-DUT test time required for receiving the aforementioned three packets is one-fourth that of the single-DUT test case.

Still, there is continuous pressure to reduce the cost of both manufacturing such devices and for testing their operation during manufacturing. Any innovation that can reduce the time required for testing such devices, without compromising the integrity of the testing, will be ultimately expected to lower test costs as a result. Accordingly, a need exists for innovative systems and techniques that address, and can obtain, these goals.

SUMMARY

The invention described herein utilizes devices under test (DUTs) outfitted with stored, predefined test sequences, testers equipped with vector-signal generation (VSG) and vector-signal analysis (VSA) functionality, and novel methods for combining loopback and single-ended test functions in order to obtain higher testing efficiency for DUTs using Bluetooth or other time-division duplex (TDD) based communications.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments but are for explanation and understanding only.

DETAILED DESCRIPTION OF EMBODIMENTS

The invention will now be described with reference to the drawing figures, in which like reference numerals refer to like parts throughout. The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric, or alphanumeric designators. Further, while the present invention has been discussed in the context of implementations using discrete electronic circuitry (preferably in the form of one or more integrated circuit chips), the functions of any part of such circuitry may, alternatively, be implements using one or more appropriately programmed processors, depending on the signal frequencies or data rates to be processed.

The invention described herein reduces the testing time of time-division duplex (TDD) based communications systems (e.g., Bluetooth) by incorporating the benefit of using predefined test sequences stored in the device under test (DUT). In addition, the invention incorporates a means for testing DUTs in parallel where, ordinarily, having them send results at the same time, using the same spectrum, would preclude being able to do so. Preferred embodiments utilize DUTs outfitted with stored, predefined test sequences, testers equipped with vector-signal generation (VSG) and vector-signal analysis (VSA) functionality, and novel methods for combining loopback and single-ended test functions in order to obtain higher testing efficiency for DUTs that use Bluetooth or other time-division duplex (TDD) based communications.

The test equipment of the described embodiments may comprise a wireless tester including, for example, other electronic components such as a vector signal generator (VSG) and a vector signal analyzer (VSA). The DUT may comprise one or more electronic components and configurations such as a number of embedded subsystems, including a host processor, memory (e.g., nonvolatile memory), a wireless transceiver, and one or more peripheral devices. The host processor may be configured to control the memory, wireless transceiver, and peripheral devices via various control interfaces. Typically, the memory stores, as firmware, programs to be used by the DUT. The controller may generally be configured to run the production test software that controls the test equipment through a communications channel, e.g., universal serial bus (USB), serial peripheral interface (SPI), RS-232 serial interface, general purpose interface bus (GPIB), Ethernet, etc. The test equipment is configured to communicate with the DUT (such as via an internal wireless transceiver) via a communications channel, which can be a wired or wireless interface. The test equipment will need to provide signal transmission, signal reception, and signal analysis functions. It will be readily appreciated that, depending on how these functions are implemented, such instrumentation can be implemented by one test instrument or by coupling multiple test instruments together.

Figure 4:
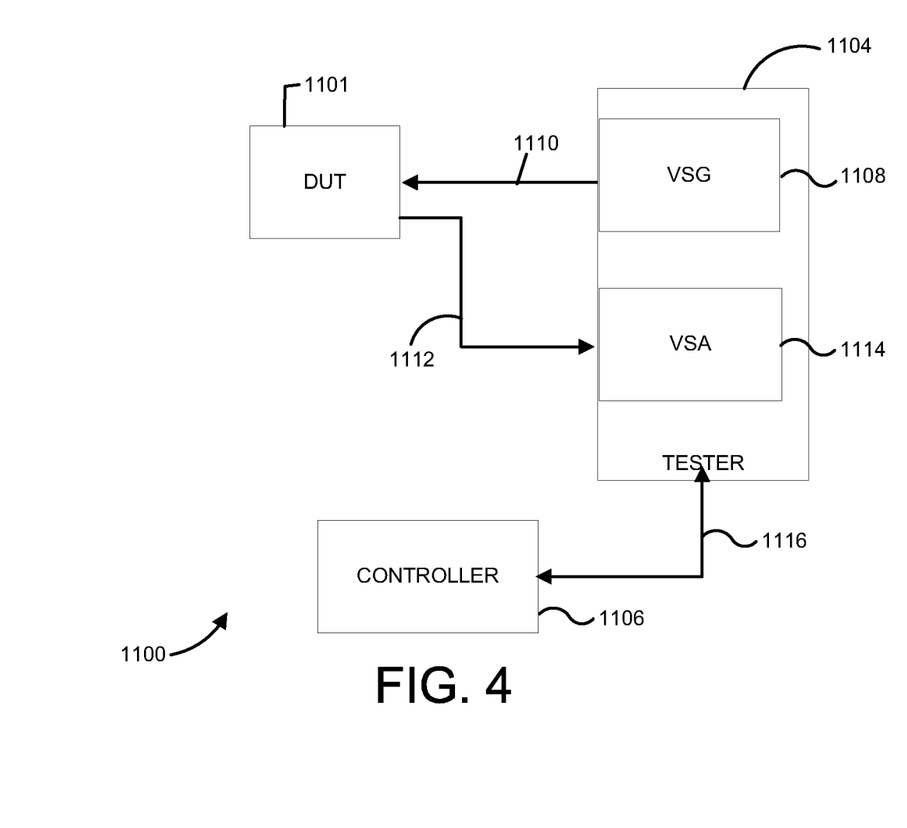
FIG. 4 is a functional block diagram of the equipment environment for testing according to an exemplary disclosed embodiment.

Referring to FIG. 4, the exemplary embodiments of a test method in accordance with the presently claimed invention can be practiced using hardware 1100 well known in the art. For example, the tester 1104 may generally include a signal source 1108 in the form of a vector signal generator (VSG) which provides test signals 1110 to convey the data packets to the device under test (DUT) 1101. In return, the DUT 1101 may be configured to transmit return data packets 1112 to the receiver 1114 within the tester 1104, typically in the form of a vector signal analyzer (VSA). (While the DUT 1101 is typically a wireless communication device and the communication channel via which the signals 1110, 1112 are conveyed can also be wireless, in a manufacturing test environment such a communication channel is more often wired.) As noted, the tester 1104 is under control of the controller 1106 (e.g., a personal computer), which communicates with the tester 1104 via control signals 1116 in which various control signals and test data are conveyed.

Figure 5:
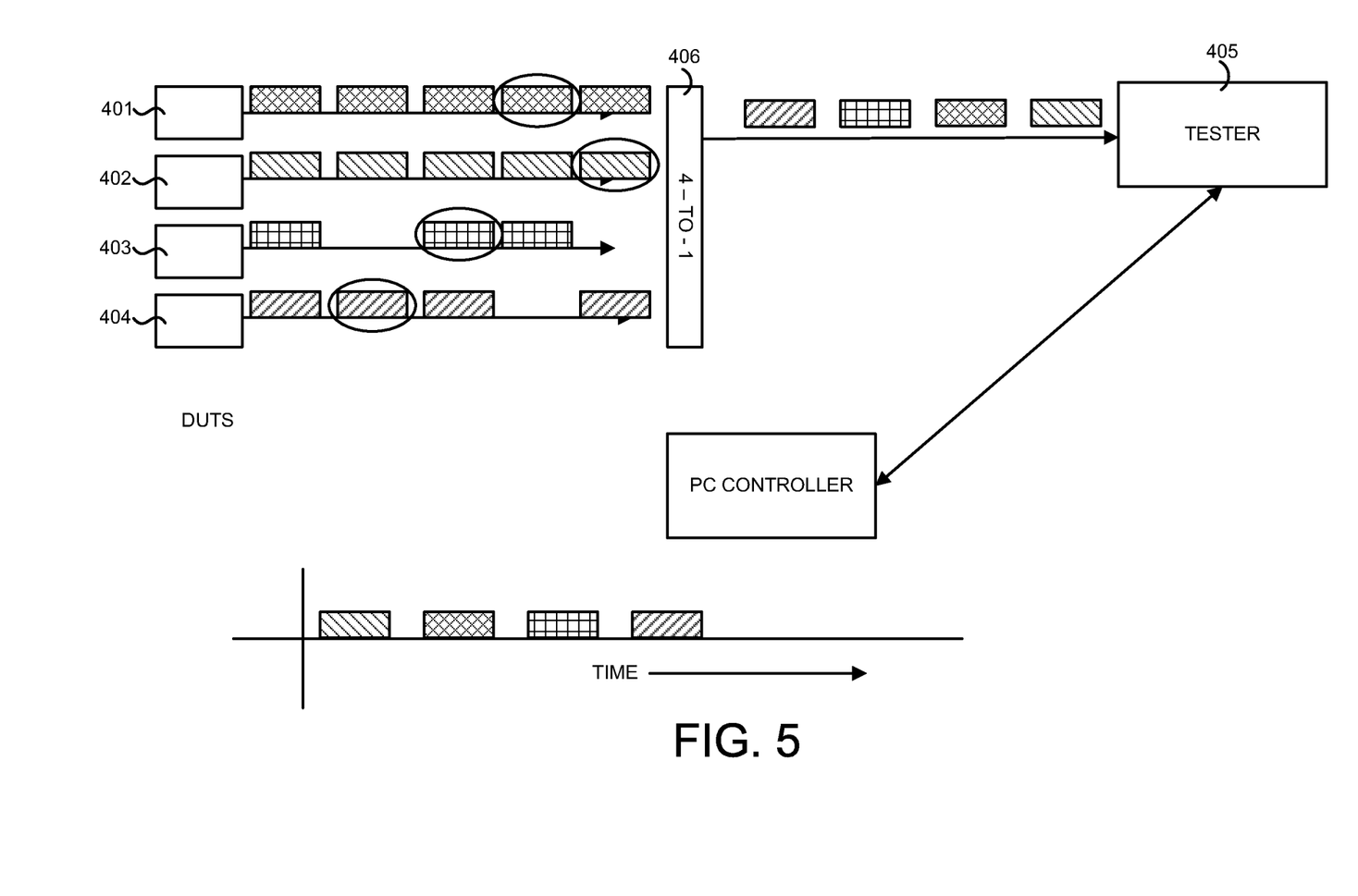
FIG. 5 illustrates the wireless test system of FIG. 3 including an improved testing and confirmation scheme according to an exemplary disclosed embodiment.

FIG. 5 depicts the loopback response of the four DUTs (as shown in FIG. 3). A sequence of packets (sent by the tester to the DUTs) is sent back to the tester by the DUTs after being embedded in a new packet. Clearly, when a DUT does not receive a packet from the tester during a particular time slot, it will not return a packet. Thus, each DUT is configured to send back respective packets that contain the payload data sent by the tester (as in FIG. 3). A tester interface 406 permits selection among the incoming looped-back packets so that it analyzes the aforementioned looped-back packets one at a time. As shown in FIG. 5, during time slot 1 tester 405 samples port 1, but the DUT connected to that port, in this case, does not receive nor return a packet. Hence, there is no data capture during time slot 1. At time slot 2, the tester sampling port 1 does capture a packet and now moves on to port 2. During the next n time slots, no packet is received at port 2. Tester 405 records this occurrence as a failure and will no longer sample port 2 during the remainder of this test. Now, at the end of n+2 time slots, tester 405 moves on to port 3 and by now the three remaining and working DUTs are all sending loopback return packets. So, at time slot 2+n+1 tester 405 will capture the packet at port 3, and move on to port 4. At time slot 2+n+2, tester 405 will capture the return packet on port 4. Here, four-to-one switching or attenuation occurs, thereby permitting the VSA of tester 405 to receive and analyze the received loopback packets one at a time. In one disclosed embodiment, the tester interface 406 may be part of (e.g., internal to) and controlled by a host controller of tester 405. In another embodiment, tester interface 406 may be separate from (e.g., external to) tester 405 and controlled by the host controller of tester 405 via a control interface (not shown).

In some instances, some packets may not be received by one or more DUTs and, therefore, may not produce a loopback packet during a respective time slot. For example, it is reasonable that some packets may not be received by one or more DUTs, since packets are sent by the tester near the sensitivity limits of a DUT. The actual captures could require extra timeslots to make up for times in which the tester is sampling a port where a packet has not been received and therefore a looped back packet has not been sent, as described in the previous paragraph.

Figure 6:
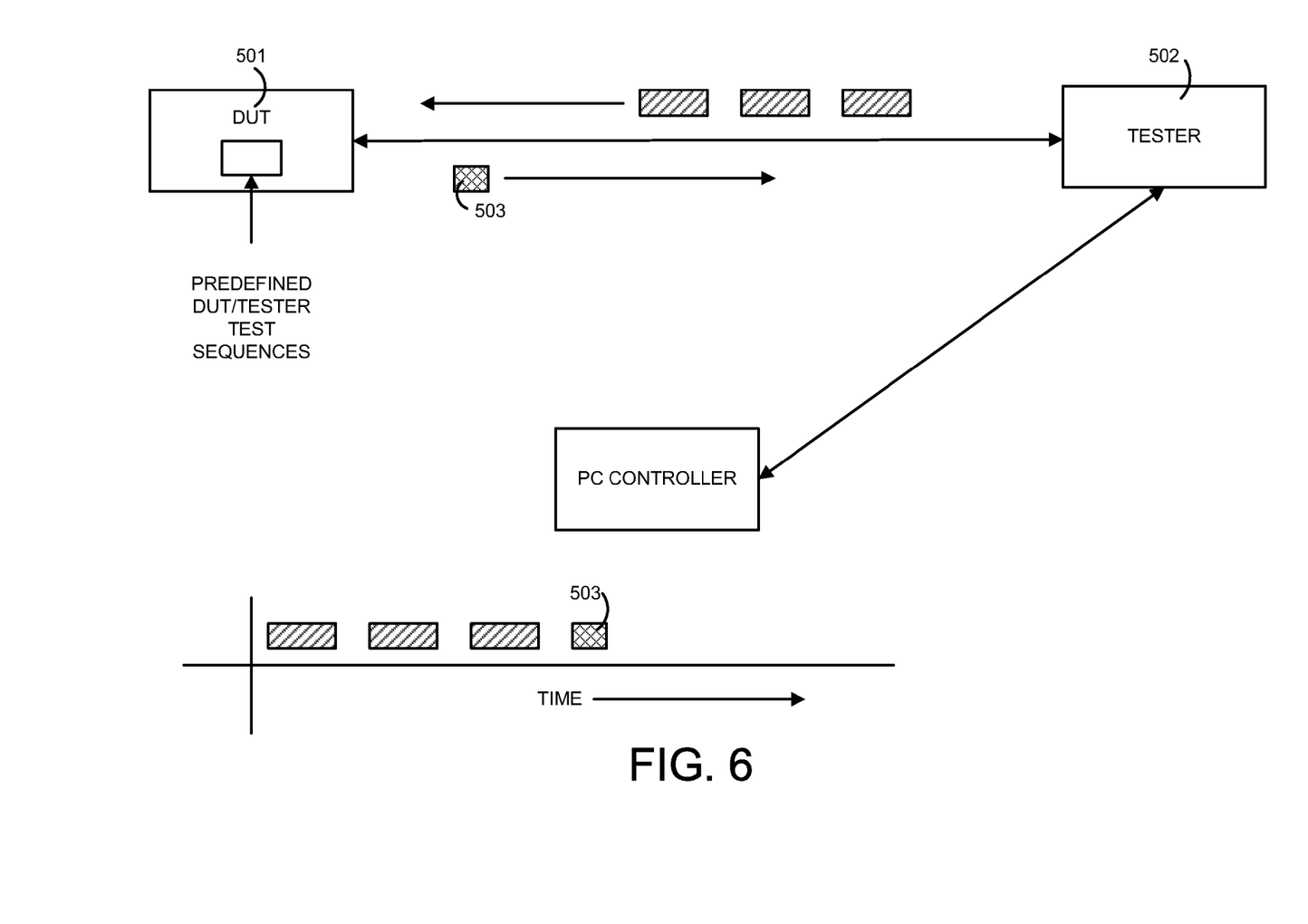
FIG. 6 illustrates a single-ended test according to an exemplary disclosed embodiment.

FIG. 6 depicts a single-ended test wherein a known sequence of packets is sent to a DUT 501, and after some predefined number of packets, n, has been received, the DUT sends a test "summary" packet 503 back to a tester 502. In some disclosed embodiments, this system may utilize the same apparatus as in FIGS. 1 and 2. In the setup of FIG. 6, DUT 501 is configured to utilize its predefined test sequence "knowledge" to determine the agreed-upon number of received packets or predefined number of received bits (whether good or bad) it must receive in order to complete the test sequence. When that predefined number is reached, DUT 501 responds by sending a test summary packet 503 back to tester 502 for analysis. This "single-ended" test procedure takes less time than a loopback procedure, because the summary packet takes just one time slot (to return the summary packet 503) regardless of how many packets and time slots are used by the tester 502 for sending incoming packets to the DUT 501. Furthermore, the packets sent by tester 502 to DUT 501 may be spaced more closely, because there is no need to anticipate a summary packet, at least, until the number of packets sent to DUT 501 is equal to the predefined number that would evoke a summary packet.

Figure 7:
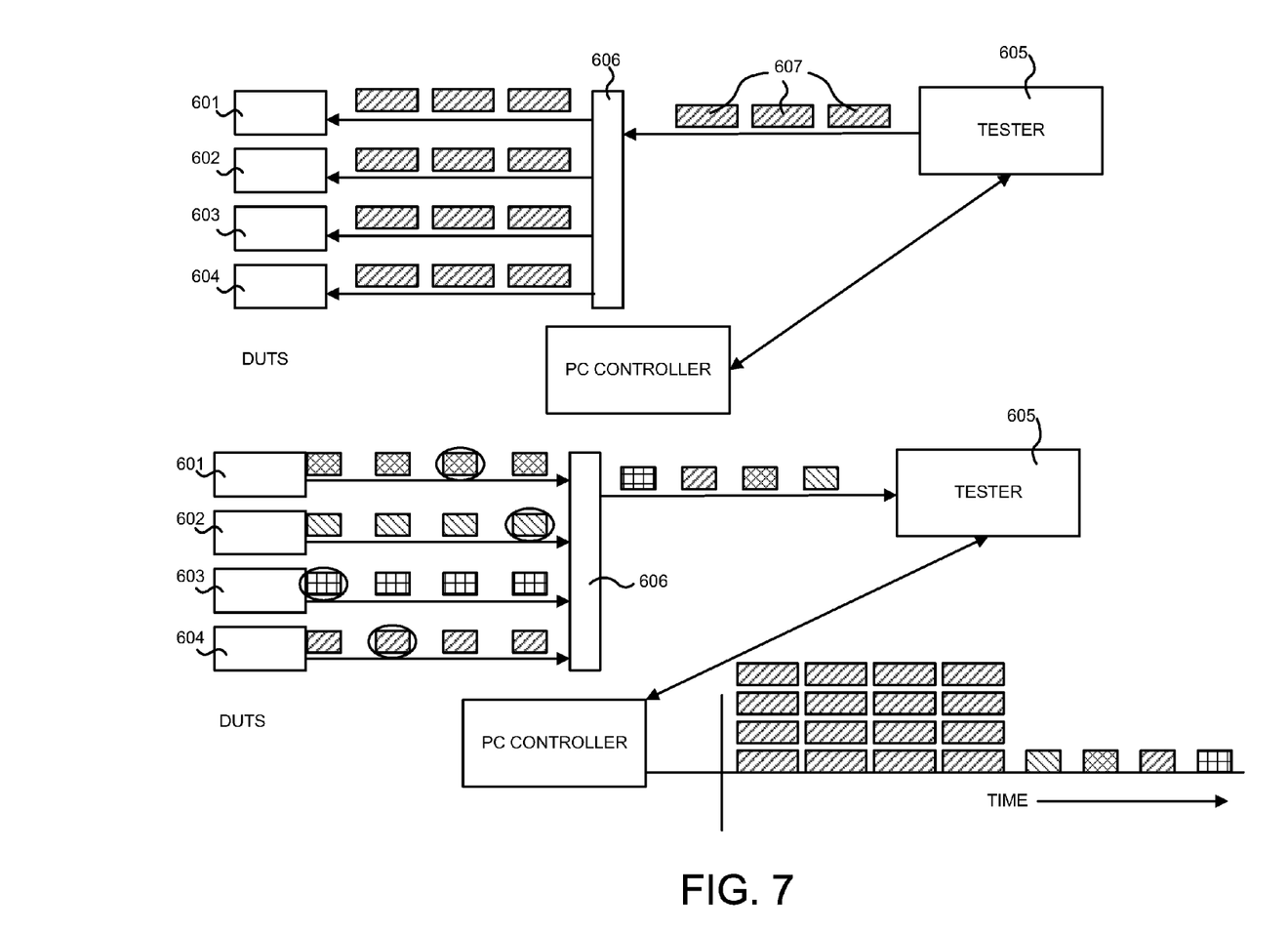
FIG. 7 illustrates the wireless test system of FIG. 6 including an improved testing and confirmation scheme according to an exemplary disclosed embodiment.

FIG. 7 depicts a tester 605 sending a sequence of packets 609 that are split into four packets and sent in parallel to a plurality of DUTs. In this example, four DUTs are configured to receive the packets. Thus, in a preferred embodiment, the sequence of packets sent by tester 605 is replicated and sent simultaneously to each of the four DUTs. In response, having received some predetermined number of packets, "n", the DUTs return their summary packets 607. Summary packets 607 act as single-ended confirmation packets (e.g., summary packet 503 in FIG. 6). Disclosed embodiments provide four-to-one switching or selective attenuation, such as via tester interface 606, in connection with the tester 605 to select the packets received from DUTs for analysis, one at a time. As shown in FIG. 7, respective DUTs configured on ports 2 and 3 of tester interface 606 have received "n" packets and begin sending one summary packet 607 in time slot n+1 followed by three repeats during time slots n+2, n+3 and n+4. The DUTs on ports 1 and 4, however, take an extra time slot to receive their n packets, and therefore begin sending their first summary packets 607 at time slot n+2 and continue to send their three repeated summary packets 607 during n+3, n+4 and n+5. Tester 605 began its capture routine at time slot n+1 by sampling port 1 and monitoring ports 2, 3, and 4. As shown, tester 605 would have sensed packets on ports 2 and 3 but not captured a packet on port 1 during time slot 1. Hence, in accordance with a disclosed embodiment, tester 605 would have, by virtue of a prescribed algorithm, continued its operation and moved to a next port, where it continues to monitor for an arriving summary packet 607. Having sensed summary packets 607 on ports 2 and 3, tester 605 schedules to go to port 2, then port 3 (or vice-versa) during time slots n+2 and n+3. For example, during time slot 2, tester 605 moves to monitor port 2 and captures the summary packet 607 from the respective DUT configured thereto. Then, tester 605 moves to monitor port 3 during time slot 3 and captures the summary packet 607 from the respective DUT configured thereto. Tester 605 is also configured to monitor the other ports and, in this example, "sees" that summary packets 607 have begun arriving on ports 1 and 4 during time slot 2. Thus, again, tester 605 will schedule to go to port 4, then 1 (or vice-versa) during time slots n+4 and n+5. For example, during time slot 4 tester 605 samples port 4 and captures the summary packet 607 from the respective DUT configured thereto. Finally, during time slot 5, tester 605 captures the last summary packet 607 from port 1.

Thus, in the exemplary drawing of FIG. 7, in a first time slot, return summary packets 607 are not available from the DUTs connected to ports 1 and 4. As a result, in time slot n+1, there is no summary packet capture. Tester 605 moves on to capture summary packets 607 from the DUTs connected to ports 2, 3 and 4 in successive time slots (n+2 to n+4), then captures the summary packet 607 from the respective DUT connected to port 1 during time slot n+5. Accordingly, it will be appreciated that, for "M" DUTs being tested in parallel as described herein, a minimum of M summary packets 607 will be needed to be returned by the M DUTs to ensure that a summary packet from each DUT can be captured.

Figure 8:
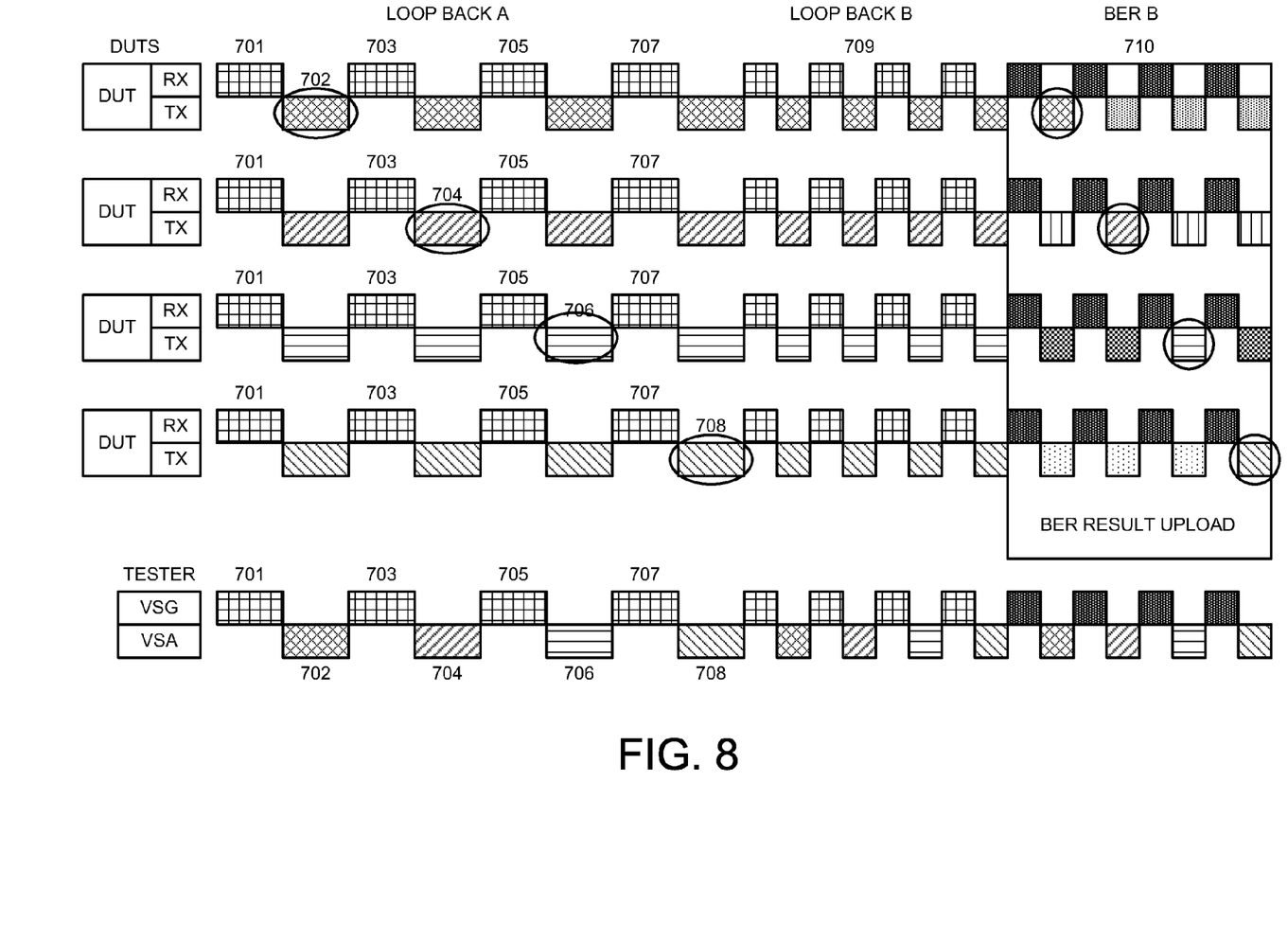
FIG. 8 illustrates a testing scheme, loopback response, and bit-error rate summary according to an exemplary disclosed embodiment.

FIG. 8 illustrates a testing scheme combining loopback response, and bit-error-rate summary according to an exemplary disclosed embodiment. The tester begins by sending a sequence of packets "A" (701, 703, 705, 707) in parallel to each receiver of a plurality of DUTs. During the Loop Back A sequence, packets 701, 703, 705 and 707 are sent to the four DUTs. Each DUT that receives a packet will then repackage the payload in a new packet (such as 702, 704, 706, 708) and send it back to the tester as part of a transmitter-test routine. As shown, each DUT does send a loopback packet to the tester during the Loop Back A sequence, so it takes eight time slots to complete this exemplary process. This embodiment represents an ideal or best-case scenario. More likely, since the packets may be sent near the lower limit of sensitivity, one or more DUTs may not receive the incoming packet and will, therefore, not return a loopback packet during a particular time slot. As already described, in such cases, it may take one or more additional time slots before all loopback packets are captured by the tester.

During Loop Back B sequence, the tester may send packets with at least one different characteristic from that of Loop Back A sequence (e.g. frequency, power, modulation) and, again, the DUTs, upon receiving a packet will repackage the payload in a new packet and loop it back to the tester. The current embodiment depicts an idealized eight time slots to complete the exemplary process, which presumes that each DUT received each incoming packet successfully.

Loop Back A sequence and Loop Back B sequence are testing transmit parameters. Bit-error rate information may also be accumulated, so that when the Loop Back A and Loop Back B transmission (TX) test sequences conclude, the tester may send additional packets intended for bit-error-rate computation, or the DUTs may have already used the TX test packets to accumulate BER data. Hence, during the BER B sequence, in response to a summary packet request from the tester, the DUTs will respond with summary packets, as shown. Although FIG. 8 depicts an eight-time-slot sequence for the solicitation and receipt of BER summary packets, as with the Loop Back A and Loop Back B sequences, it may, in fact, take additional time slots to capture the summary packets from all of the DUTs being tested.

Figure 9:
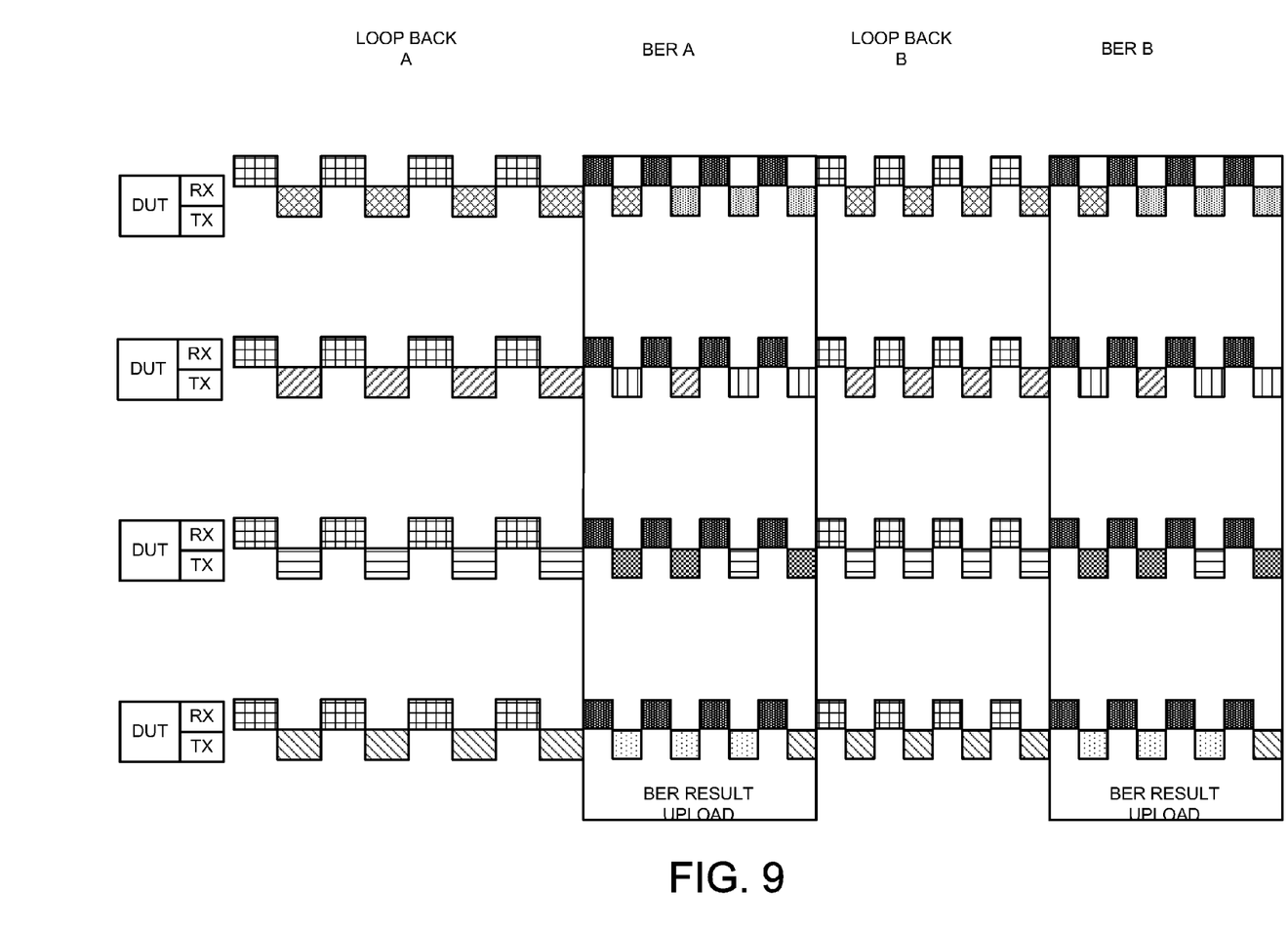
FIG. 9 illustrates another testing scheme, loopback response, and bit-error rate summary according to an exemplary disclosed embodiment.

FIG. 9 illustrates, generally, a similar testing sequence as produced in FIG. 8. However, in FIG. 9, a bit-error-rate upload (BER A) sequence is initiated between the Loop Back A and Loop Back B sequences. The sequence of Loop Back B may constitute a power change, for example, different from Loop Back A. Hence, the configuration and employed method of the present invention provides improved testing flexibility and generated analytical results for various characteristics of applied sequence data.

Figure 10:
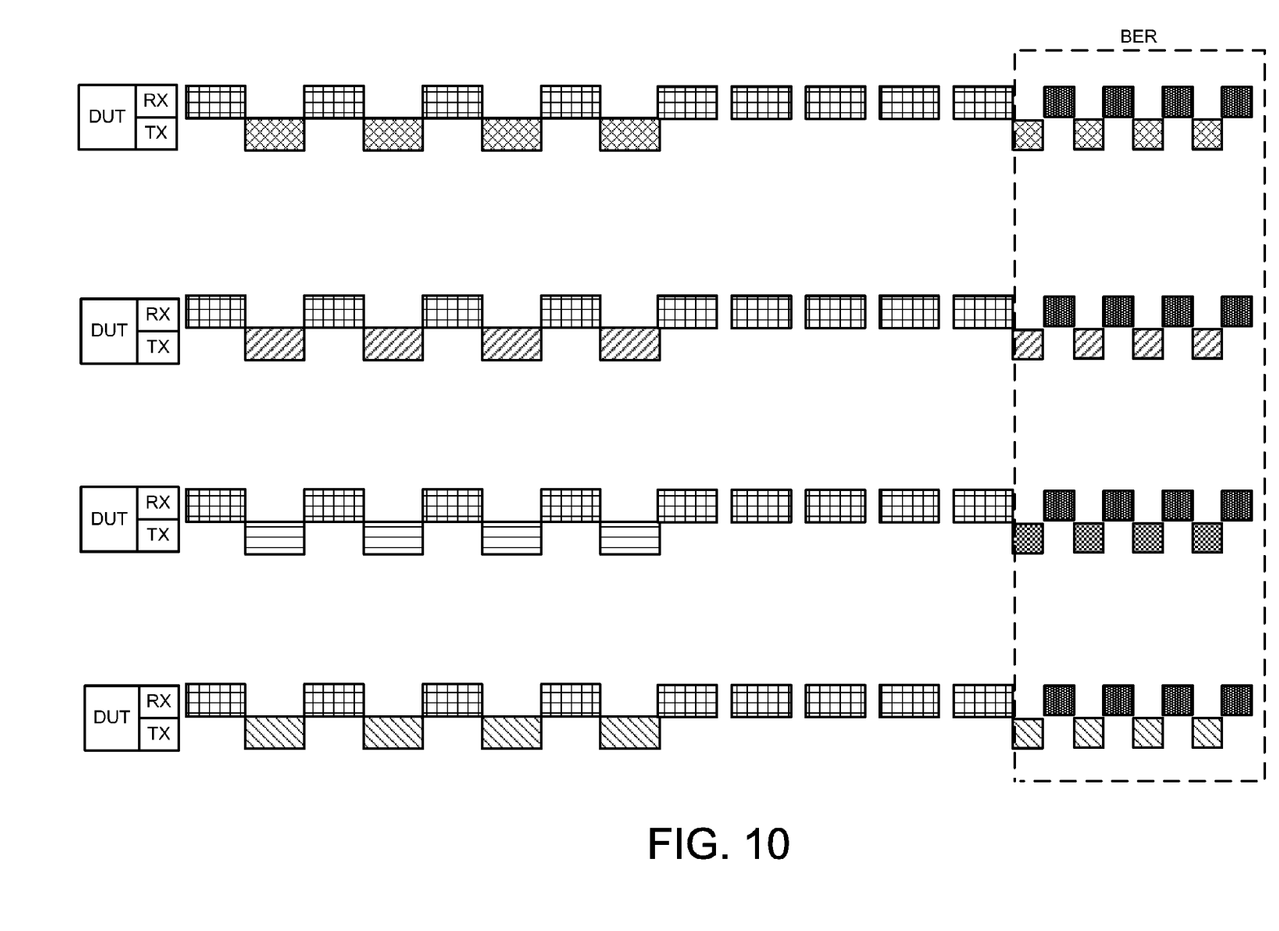
FIG. 10 illustrates an ideal testing scenario according to an exemplary disclosed embodiment.
Figure 11:
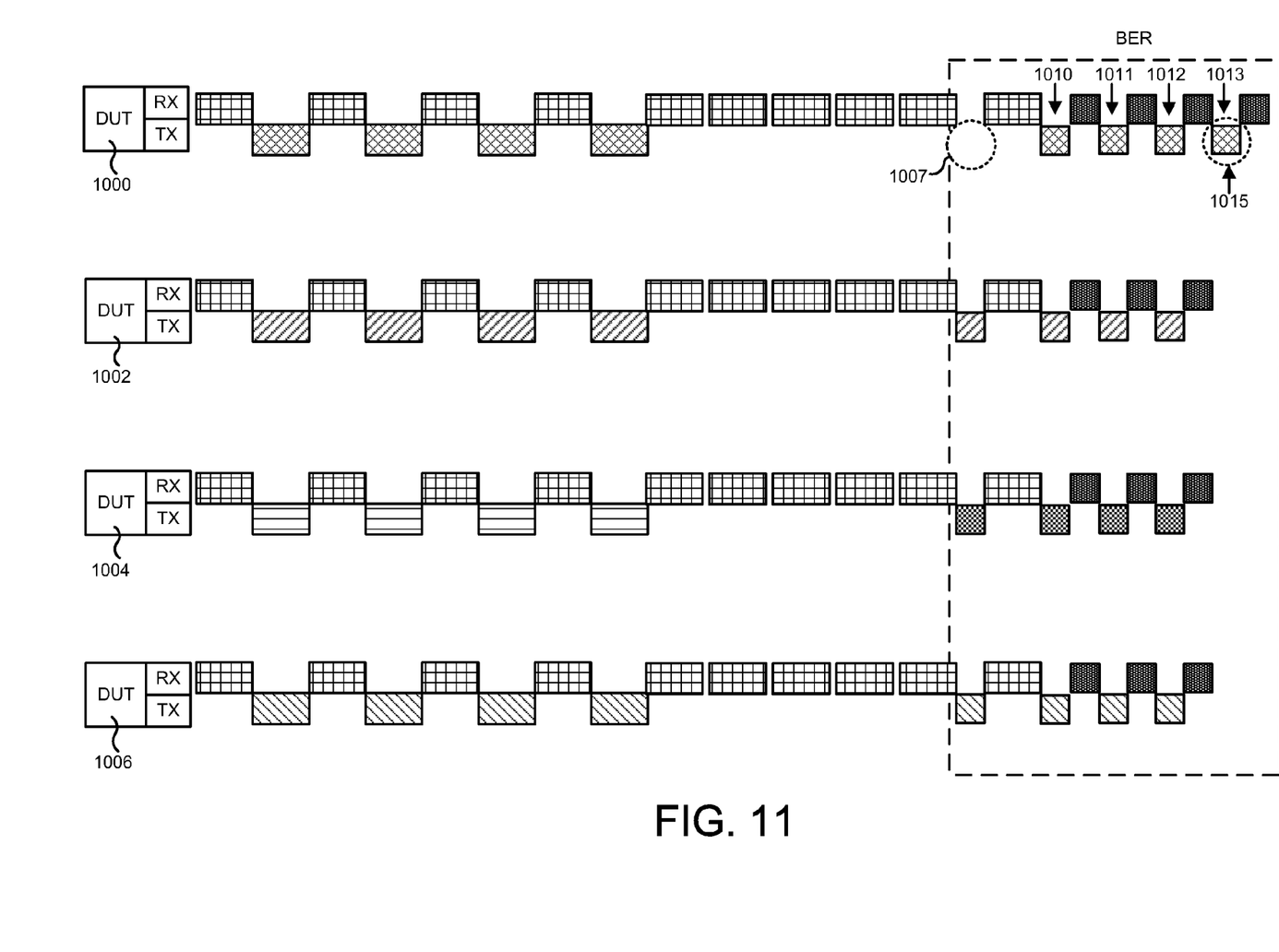
FIG. 11 illustrates a non-ideal testing scenario according to an exemplary disclosed embodiment.

Referring to FIG. 10, at the conclusion of a loop-back sequence, the tester continues sending packets that may augment data accumulated during the loop-back sequence with data needed for calculating packet-error rate (PER) and bit-error rate (BER). Although the drawing shows a sequence of 5 packets preceding the BER sequence, additional sequences may be employed. When ready, the DUT transmits a BER summary packet. In FIG. 10, all the DUTs are ready simultaneously, so the BER sequence is concluded in eight time slots. This is a best-case scenario. It is possible, however, as shown in FIG. 11, that all the DUTs will not be ready during the same initial time slot. The embodiment of FIG. 11 depicts a packet which failed to be received from a respective DUT 1000 during a first time slot 1002 for performing a BER computation. Therefore, embodiments of the disclosed invention may require one or more additional time slots 1004 to receive a delayed packet 1006 in order to conclude the BER test.

This disclosed system and method of employing predefined sequences with loopback testing, and sending RX packets to the DUTs in parallel, permits a less time-consuming approach to RX/TX testing. When coupled with single-ended testing for measuring bit-error rate, further time compression is realized by the invention. The overall benefit is shorter test times compared with testing DUTs serially using a tester with a single VSA/VSG as well as lower test-system costs compared with testing multiple DUTs essentially concurrently using multiple testers each having a VSA and VSG.

In accordance with the exemplary embodiments discussed above, testing of the DUT for the various data blocks n, n+1, n+2, . . . includes transmitting the data blocks at different respective frequencies F1, F2, F3, . . . . However, as will be readily apparent to those of ordinary skill in the art, transmission of the data blocks signal can include changes in other signal characteristics. For example, in addition to or instead of changing the frequency via which the data packets are transmitted, other signal characteristics can be varied, including, without limitation, data rate, signal modulation type and signal power. Accordingly, the prescribed test criterion or criteria can, as desired, involve various signal characteristics, including, without limitation, frequency, data rate, signal modulation type and signal power.

It will be apparent to those skilled in the art that various modifications and variations can be made in the disclosed apparatus and method without departing from the scope of the disclosure. Additionally, other embodiments of the apparatus and method will be apparent to those skilled in the art from consideration of the specification. It is intended that the specification and examples be considered as exemplary only, with a true scope of the disclosure being indicated by the following claims and their equivalents.

The system, as described in the present technique or any of its components, may be embodied in the form of a computer system. Typical examples of a computer system include a general-purpose computer, a programmed microprocessor, a microcontroller, a peripheral integrated circuit element, and other devices or arrangements of devices that are capable of implementing the steps that constitute the method of the present technique.

The computer system comprises a computer, an input device, a display unit, and/or the Internet. The computer further comprises a microprocessor. The microprocessor is connected to a communication bus. The computer also includes a memory. The memory may include random access memory (RAM) and read only memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer to, as well as reception of data from, other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present technique. The set of instructions may be in the form of a software program. Further, the software may be in the form of a collection of separate programs, a program module with a larger program or a portion of a program module, as in the present technique. The software may also include modular programming in the form of object-oriented programming. The processing of input data by the processing machine may be in response to user commands, results of previous processing, or a request made by another processing machine.

While the foregoing description is presented to enable a person of ordinary skill in the art to make and use the technique, and is provided in the context of the requirement for a obtaining a patent. The present description is the best presently contemplated method for carrying out the present technique. Various modifications to the preferred embodiment will be readily apparent to those skilled in the art, and the generic principles of the present technique may be applied to other embodiments, and some features of the present technique may be used without the corresponding use of other features. Accordingly, the present technique is not intended to be limited to the embodiment shown but is to be accorded the widest scope consistent with the principles and features described herein.

What is claimed is:

1. A method of testing a plurality of communication devices in a test period, comprising:

transmitting a sequence of data packets from a tester;

replicating in parallel the sequence of data packets to create a parallel sequence of data packets;

transmitting each parallel sequence of data packets to a respective one of a plurality of devices under test (DUTs);

repackaging the received sequence of data packets and transmitting the repackaged data packets from each one of the plurality of DUTs to the tester; and determining a faulty DUT from the plurality of DUTs by evaluating whether a repackaged data package has been forwarded from a respective DUT within the test period by:

selecting from among the repackaged data packets in a prescribed time slot; and evaluating whether a first repackaged data packet is available within the prescribed time slot and, if not, evaluating whether a second repackaged data packet is available within another time slot of the test period.

2. The method of claim 1, wherein said determining a faulty DUT from the plurality of DUTs by evaluating whether a repackaged data package has been forwarded from a respective DUT within the test period comprises switching among available ones of respective summary data packets from said plurality of DUTs.

3. The method of claim 1, wherein said determining a faulty DUT from the plurality of DUTs by evaluating whether a repackaged data package has been forwarded from a respective DUT within the test period comprises sequentially switching among available ones of respective summary data packets from said plurality of DUTs.

4. The method of claim 1, further comprising:

re-determining whether a previously unavailable repackaged data packet previously unavailable within a prescribed time slot is available within another time slot of the test period.

5. The method of claim 1, wherein the determining step includes determining whether a repackaged data packet is available from a listing of "n" number of DUTs by selecting a parameter associated with one of the "n" number of DUTs in a prescribed order.

6. The method of claim 5, wherein the parameter includes selecting an assigned communications connection between a respective one of "n" number of DUTs and the tester.

7. The method of claim 6, wherein the communications connection is a port electrically connected to a respective one of "n" number of DUTs and the tester.

8. The method of claim 6, wherein the communications connection is tested wirelessly.

9. The method of claim 1, further comprising transmitting data packets having different characteristics from one another.

10. The method of claim 9, wherein the different characteristics include frequency, power, and modulation.

11. The method of claim 1, further comprising utilizing the repackaged data packets to determine bit-error-rate (BER).

12. The method of claim 11, further comprising supplementing the repackaged data packets by transmitting an additional sequence of data packets to determine bit-error-rate (BER).

13. The method of claim 1, further comprising utilizing the repackaged data packets to determine bit-error-rate (BER) at a time slot between the step of evaluating whether the repackaged data packet is available within a prescribed time slot and the step of evaluating whether another repackaged data packet is available within another time slot of the test period.

14. The method of claim 13, wherein the determination of BER occurs in a final time slot of the test period.

15. The method of claim 11, further comprising supplementing the repackaged data packets by transmitting an additional sequence of data packets to determine packet-error-rate (PER).

16. The method of claim 1, wherein said plurality of DUTs comprises M DUTs and said repackaged data packets comprises at least M repackaged data packets from each one of said M DUTs.

17. The method of claim 1, wherein said transmitting the repackaged data packets from each one of the plurality of DUTs to the tester comprises switching among said plurality of DUTs to access therefrom respective summary data packets.

18. The method of claim 1, wherein said transmitting the repackaged data packets from each one of the plurality of DUTs to the tester comprises sequentially switching among said plurality of DUTs to access therefrom respective summary data packets.

19. The method of claim 1, wherein said transmitting the repackaged data packets from each one of the plurality of DUTs to the tester comprises switching among available ones of respective summary data packets from said plurality of DUTs.

20. The method of claim 1, wherein said transmitting the repackaged data packets from each one of the plurality of DUTs to the tester comprises sequentially switching among available ones of respective summary data packets from said plurality of DUTs.

21. The method of claim 1, wherein said determining a faulty DUT from the plurality of DUTs by evaluating whether a repackaged data package has been forwarded from a respective DUT within the test period comprises switching among said plurality of DUTs to access therefrom respective summary data packets.

22. The method of claim 1, wherein said determining a faulty DUT from the plurality of DUTs by evaluating whether a repackaged data package has been forwarded from a respective DUT within the test period comprises sequentially switching among said plurality of DUTs to access therefrom respective summary data packets.

* * * * *